US006036342A

United States Patent [19]

Aoki

[11] Patent Number: 6,036,342

[45] Date of Patent: Mar. 14, 2000

[54] VEHICLE HEAD LAMP

[75] Inventor: Sumito Aoki, Shizuoka, Japan

[73] Assignee: Koito Manufacturing Co., Ltd., Tokyo, Japan

[21] Appl. No.: 09/082,539

[22] Filed: May 21, 1998

[30] Foreign Application Priority Data

May 22, 1997 [JP] Japan .................................... 9-148634

[51] Int. Cl.$^{7}$ ........................................................ B60Q 1/04

[52] U.S. Cl. ........................... 362/539; 362/351; 362/538

[58] Field of Search ..................................... 362/277, 278, 362/303, 305, 319, 320, 351, 361, 255, 512, 539, 519, 538

[56] References Cited

U.S. PATENT DOCUMENTS

| | | | |
|---|---|---|---|
| 950,600 | 3/1910 | Perry | 362/277 |
| 2,203,410 | 6/1940 | Gelb | 362/277 |
| 5,067,054 | 11/1991 | Oshio et al. | 362/61 |
| 5,111,368 | 5/1992 | Suzuki et al. | 362/61 |
| 5,195,815 | 3/1993 | Watanabe et al. | 362/61 |
| 5,895,113 | 4/1999 | Ozaki et al. | 362/546 |

*Primary Examiner*—Y. Quach
*Attorney, Agent, or Firm*—Morgan, Lewis & Bockius LLP

[57] ABSTRACT

A vehicle head lamp comprises: a light source bulb; a reflector made of resin, having a reflective surface for reflecting light from the light source forward; a shade for controlling the shading of the light from the light source bulb; a boss provided with the reflector, for mounting the shade such that the boss is projected forward from the reflective surface; and a wall-thickness reducing portion having a hole extending forward from the back of the reflector inside the boss.

8 Claims, 2 Drawing Sheets

VEHICLE HEAD LAMP

BACKGROUND OF INVENTION

The present invention relates to a vehicle head lamp having a shade.

There are many vehicle head lamps which are provided with shades as members for controlling the shading of light from light source bulbs. Such a shade is usually mounted in the reflector and one known shade mount is such that a boss projecting forward from a reflective surface is formed on a plastic reflector so as to secure the shade to the leading end of the boss.

In the case of such a shade mount using a boss, it is in many cases needed to form the boss which is substantially long in consideration of the position where the shade is disposed. However, the wall thickness of the boss for the reflector has been set relatively greater than that of the other portions because a solid boss has heretofore been employed.

In consequence, molten resin filled up in a boss forming portion in a mold cavity is not easily solidified when the reflector is formed by injection molding and the problem is that the molding cycle has to be extended to some degree.

SUMMARY OF INVENTION

An object of the present invention made in view of the situation stated above is to provide a vehicle head lamp capable of shortening the molding cycle of a reflector in a case where a shade mount using a long boss is employed.

According to the present invention, there is provided a vehicle head lamp including a light source bulb; a reflector made of resin, having a reflective surface for reflecting light from the light source forward; a shade for controlling the shading of the light from the light source bulb; a boss provided with the reflector, for mounting the shade such that the boss is projected forward from the reflective surface; and a wall-thickness reducing portion having a hole extending forward from the back of the reflector inside the boss.

The external shape, position of formation and the like of aforesaid boss are not particularly restricted as long as it is so formed as to project forward from the reflective surface. Moreover, the depth, cross-sectional shape and the like of the hole of the wall-thickness reducing portion are not particularly restricted as long as it is so formed as to extend forward from the back of the reflector.

Since the hole of the wall-thickness reducing portion extending forward from the back of the reflector is formed inside the boss used for mounting the shade, the boss is formed on the reflector in such a way that the boss is projected forward from the reflective surface in the vehicle head lamp according to the present invention, and the wall thickness of the boss portion on the reflector and that of the other portions can be equalized. As a result the molten resin filled up in the boss forming portion in the mold cavity when the reflector is formed by injection molding can be solidified in a short time like the molten resin filled up in the other portions.

In the vehicle head lamp having the shade mount using the long boss according to the present invention, the molding cycle of the reflector can therefore be shortened. Moreover, the formation of the hole of the wall-thickness reducing portion inside the boss makes it possible to secure a large heat-exchange surface area for radiating the heat transferred from the shade to the boss during the on-state of a lamp from a lamp chamber. Thus the heat radiation performance of the lamp is improved.

With the arrangement above, according to the present invention, the formation of the reinforcing ribs extending toward the anti-optical axis up to the inner face of the reflector in the regions opposite to the optical axis of the reflector and on the outer peripheral faces of the boss makes it possible to increase the mounting and supporting strength of the shade in the reflector without shading light incident on the reflective surface of the reflector from the light source bulb. As a result the aseismic characteristics of the lamp are improved.

DETAILED DESCRIPTION OF PREFERRED EMBODIMENTS

An embodiment of the invention will be subsequently be described with reference to the drawings.

Figure 1:
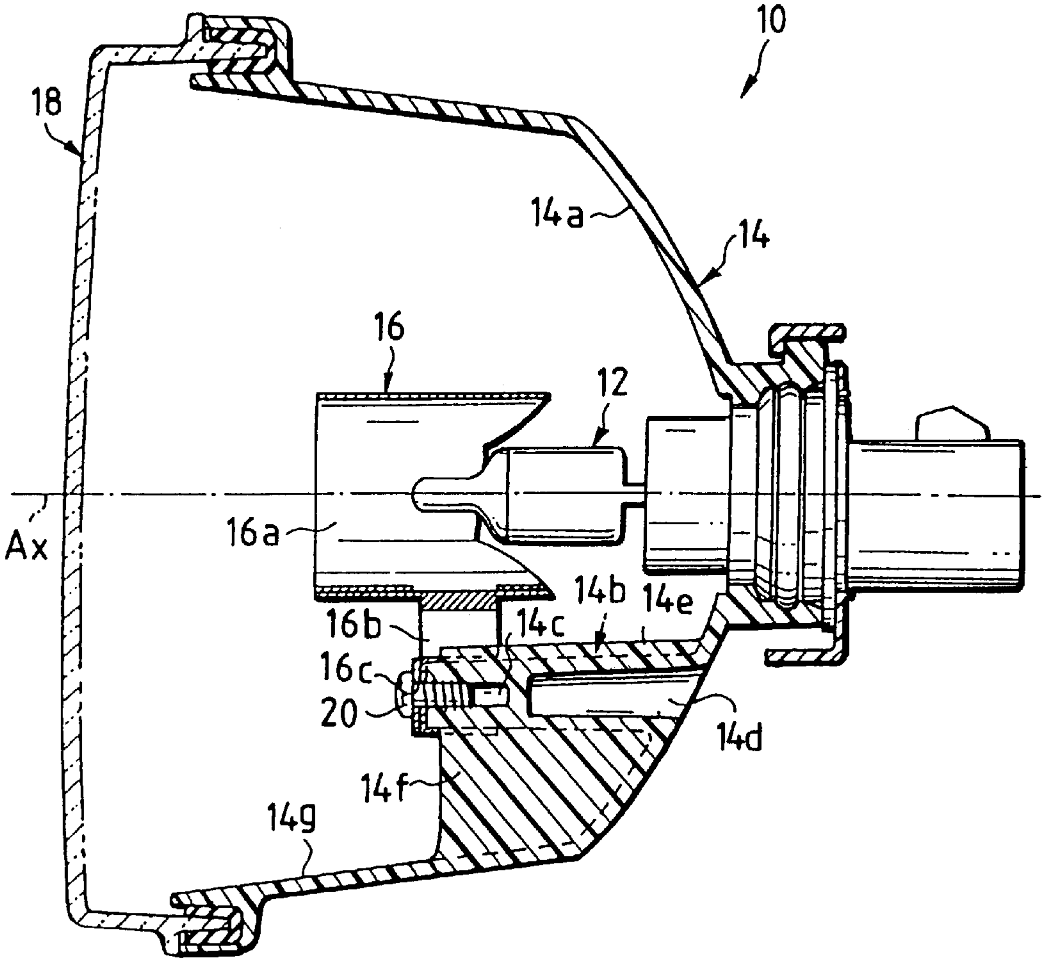
FIG. 1 is a side sectional view of a vehicle head lamp according to an embodiment of the present invention.
Figure 2:
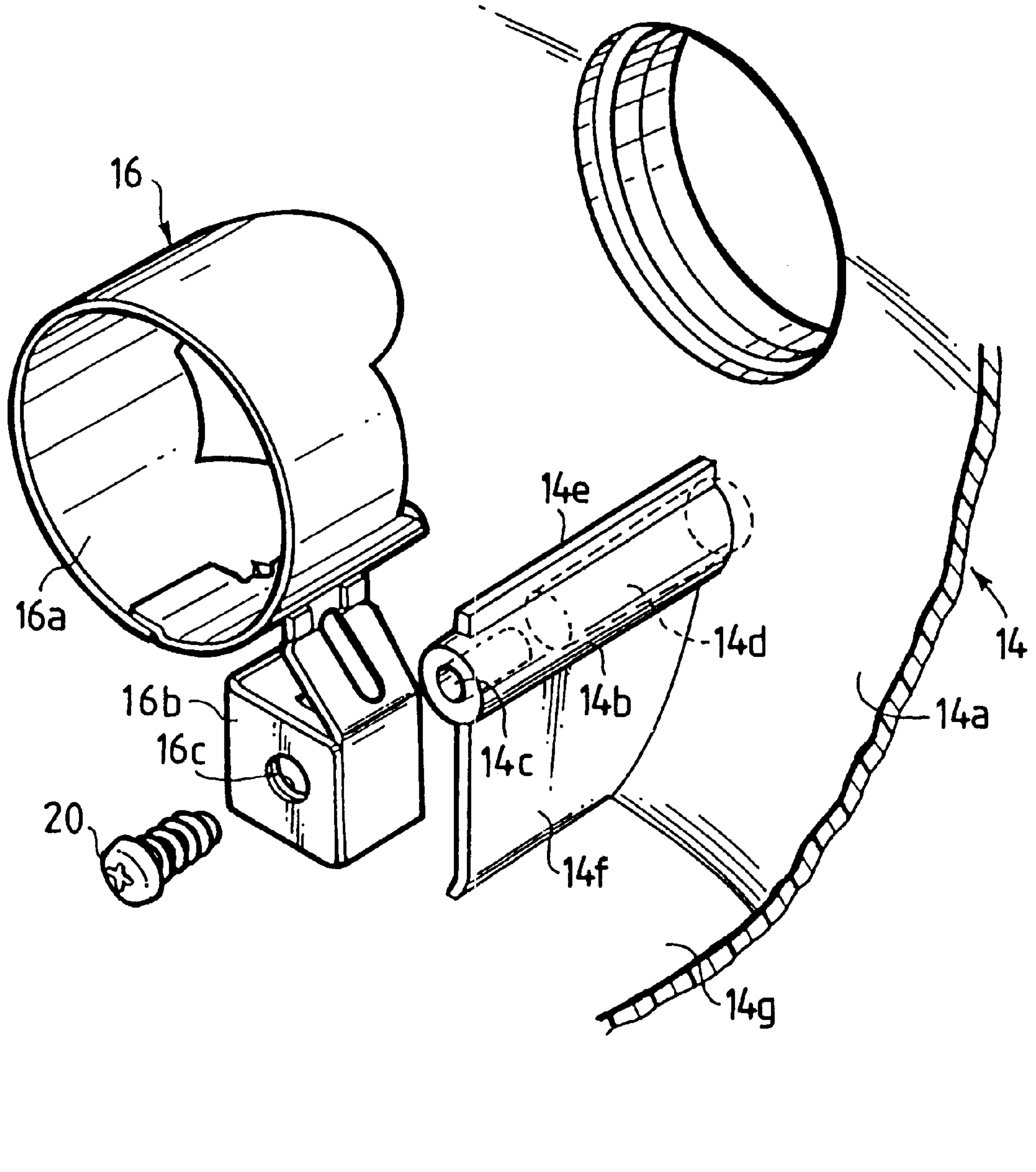
FIG. 2 is an exploded perspective view of the principal part of the head lamp.

FIG. 1 is a side sectional view of a vehicle head lamp according to an embodiment of the present invention; and FIG. 2, is an exploded perspective view of the principal part of FIG. 1.

As shown in these drawings, a head lamp 10 has a light source bulb 12, a reflector 14 which is made of resin and supports the light source bulb 12, a reflective surface 14*a* for reflecting light from the light source bulb 12 forward, a shade 16 which is mounted in the reflector 14 and used for controlling the shading of the light from the light source bulb, and a lens 18 which is disposed in front of and secured to the reflector 14.

The reflective surface 14*a* is in the form of a rotary parabolic surface with an optical axis Ax extending in the longitudinal direction as a center axis, and a long boss 14*b* for mounting the shade 16 is formed in a region under the optical axis Ax in such a way as to project forward.

A tap hole 14*c* and a wall-thickness reducing hole 14*d* whose diameter is greater than that of the tap hole 14*c* are formed inside the boss 14*b*. The tap hole 14*c* is formed in the front end edge of the boss 14*b*, whereas the wall-thickness reducing hole is formed on the base side of the boss 14*b* in such a way as to extend forward from the back of the reflector 14 up to the proximity of the tap hole 14*c*.

Reinforcing ribs 14*e*, 14*f* are respectively formed in the upper and lower end portions on the outer peripheral face of the boss 14*b*. The reinforcing rib 14*e* is a thin rib extending longitudinally up to the reflective surface 14*a*, whereas the reinforcing rib 14*f* is a thick rib extending longitudinally up the reflective surface 14*a* and also extending vertically up the lower wall surface 14*g* of the reflector 14.

The shade 16 is made from a sheet member by mechanically machining process and incorporates a light shading portion 16*a* and a mounting portion 16*b*. A screw inserting hole 16*c* is formed in the mounting portion 16*b* and by inserting a screw 20 into the screw inserting hole 16*c* and screwing the screw into the tap hole 14*c*, the shade 16 is fitted to the reflector 14.

The function of the vehicle head lamp in this emobidment will subsequently be described.

Since the wall-thickness reducing hole 14*d* extending forward from the back of reflector 14 is formed inside the long boss 14*b*, the wall thickness of the boss portion 14*b* on the reflector 14 and that of the other portions can be equalized. Consequently, the molten resin filled up in the boss 14*b* forming portion in the mold cavity when the reflector is formed by injection molding can be solidified in a short time like the molten resin filled up in the other portions.

In the vehicle head lamp having the shade mount using the long boss according to the present invention, the molding cycle of the reflector can therefore be shortened.

Moreover, the formation of the wall-thickness reducing hole 14*d* makes it possible to secure a large heat-exchange surface area for radiating the heat transferred from the shade 16 to the boss 14*b* during the on-state of the lamp from the lamp chamber.

Thus the heat radiation performance of the lamp is improved.

Since the reinforcing ribs 14*e*, 14*f* are respectively formed in the upper and lower end portions on the outer peripheral face of the boss 14*b*, it is possible to increase the mounting and supporting strength of the shade 16 in the reflector 14 without shading light incident on the reflective surface of the reflector 14 from the light source bulb 12. Particularly, the reinforcing rib 14*f* in the lower end portion (i.e., the region situated opposite to the optical axis Ax) is so formed as to extend up to the reflective surface 14*a* and the lower wall surface 14*g*. As a result the aseismic characteristics of the lamp are improved.

What is claimed is:

1. A vehicle head lamp comprising:

a light source bulb;

a resin reflector having a reflective surface for forwardly reflecting light from the light source bulb and an optical axis projecting forward from the reflecting surface;

a shade for controlling shading of the light from the light source bulb; and a boss provided with the reflector, for mounting the shade, the boss being configured such that the boss projects forward from the reflecting surface, the boss comprising a front side, a base side, outer peripheral faces, a tap hole channel formed on the front side and having a diameter, and a wall-thickness reducing channel formed on the base side, the wall-thickness reducing channel extending forward from the reflective surface and having a diameter that is greater than that of the tap hole channel.

2. The vehicle head lamp as claimed in claim 1, further comprising:

reinforcing ribs extending from the reflective surface of the reflector respectively formed in regions opposite to the optical axis of the reflector and on the outer peripheral faces of the boss.

3. The vehicle head lamp as claimed in claim 1, wherein the boss and the reflector are simultaneously molded.

4. The vehicle head lamp according to claim 1, wherein a depth of the tap hole channel is shorter than a depth of the wall-thickness reducing channel.

5. A reflector for a vehicle head lamp in which a light from a light source is shaded by a shade and reflected by the reflector, the reflector comprising:

a reflective surface for forwardly reflecting light from the light source and an optical axis projecting forward from the reflective surface; and a boss provided with the reflector, for mounting the shade, the boss being configured such that the boss projects forward from the reflecting surface, the boss comprising a front side, a base side, outer peripheral faces, a tap hole channel formed on the front side and having a diameter, and a wall-thickness reducing channel formed on the base side, the wall-thickness reducing channel extending forward from the reflective surface and having a diameter that is greater than that of the tap hole channel.

6. The reflector as claimed in claim 5, further comprising:

reinforcing ribs extending from the reflective surface of the reflector respectively formed in regions opposite to the optical axis of the reflector and on the outer peripheral faces of the boss.

7. The reflector as claimed in claim 5, wherein the reflector and the boss are molded as one piece.

8. The reflector according to claim 5, wherein a depth of the tap hole channel is shorter than a depth of the wall-thickness reducing channel.

* * * * *